United States Patent [19]

Genero et al.

[11] Patent Number: 5,284,258
[45] Date of Patent: Feb. 8, 1994

[54] TOWEL OR BLANKET SUPPORT DEVICE

[76] Inventors: Claude P. Genero; Gail A. Genero, both of 30 Phillips Street, Dianella (Perth) WA 6062, Australia

[21] Appl. No.: 923,907
[22] PCT Filed: Mar. 6, 1991
[86] PCT No.: PCT/AU91/00077
 § 371 Date: Aug. 25, 1992
 § 102(e) Date: Aug. 25, 1992
[87] PCT Pub. No.: WO91/13582
 PCT Pub. Date: Sep. 19, 1991

[30] Foreign Application Priority Data

Mar. 6, 1990 [AU] Australia .................. PJ8941
Nov. 20, 1990 [AU] Australia .................. PK3426

[51] Int. Cl.$^5$ ................................................ A47F 7/00
[52] U.S. Cl. ........................................ 211/59.4; 211/46
[58] Field of Search ............... 211/59.4, 46, 144, 10, 211/13

[56] References Cited

U.S. PATENT DOCUMENTS

| | | | |
|---|---|---|---|
| 520,494 | 5/1894 | Parsons | 211/144 X |
| 1,411,029 | 3/1922 | Isham . | |
| 2,172,013 | 9/1939 | Parry | 211/59.4 X |
| 2,299,780 | 10/1942 | Wolf | 211/13 |
| 2,969,153 | 1/1961 | Leon | 211/59.4 |
| 3,137,251 | 6/1964 | Pendergrast, Jr. | 211/59.4 X |
| 3,295,696 | 1/1967 | Cohen | 211/13 X |

FOREIGN PATENT DOCUMENTS

| | | |
|---|---|---|
| 6990 | of 1922 | Australia . |
| 101173 | 6/1937 | Australia . |
| 56828 | 12/1970 | Australia . |
| 15020 | 5/1983 | Australia . |
| 2318844 | 10/1973 | Fed. Rep. of Germany . |

OTHER PUBLICATIONS

GB AS Feeding sheets Ross, H. H. Feb. 12, 1957 [Mar. 22, 1956], No. 9043/56.

Primary Examiner—Alvin C. Chin-Shue
Assistant Examiner—Sarah A. Lechok

[57] ABSTRACT

A device (10) for supporting articles (11) in a pile so that any one of the articles in the pile can be removed without disrupting the orderly arrangement of the pile. The device (10) comprises a guide means (13) and a plurality of spacing elements (20) mounted on and slidably movable along the guide means (13). The spacing elements adjacent to one another when in a spaced apart relationship define a storage zone (29) each for receiving and storing one of the articles. The spacing elements (20) serve to maintain at least partial separation between articles in the pile to permit any one of the articles to be removed without disrupting the pile. As each article (13) is removed from the pile, the spacing elements above it slide down along the guide means (13) to progressively decrease the height of the pile.

25 Claims, 7 Drawing Sheets

5,284,258

TOWEL OR BLANKET SUPPORT DEVICE

TECHNICAL FIELD

This invention relates to a device for supporting articles in a pile so that any one of the articles in the pile can be removed without disrupting the orderly arrangement of the pile.

BACKGROUND

Where articles are assembled in a pile, it can be difficult to remove some of the articles without disrupting the orderly arrangement of the pile. This is particularly so with articles such as bath towels and blankets which are commonly stored in a pile on a shelf. When one of the articles is required for use, it may be that the article required is not at the top of the pile and so it has to be pulled from between other articles in the pile with the result that the orderly arrangement of the pile may be disrupted.

DISCLOSURE OF INVENTION

The present invention seeks to provide a novel and useful device for supporting articles in a pile so that any one of the articles can be conveniently and easily removed without disrupting the orderly arrangement of the pile.

In one form the invention resides in a device for supporting articles in a pile, said device comprising: a guide means; a plurality of spacing elements; means provided on the spacing elements for co-acting with said guide means to allow movement relative thereto for varying the spacing between adjacent spacing element members; said spacing elements adjacent to one another when in a spaced apart relationship defining a storage zone for receiving and storing an article, said spacing elements maintaining at least partial separation between said articles in the pile to permit any one of the articles to be removed without disrupting the pile.

For preference, said spacing elements comprise leaves, said storage zones being defined between the major faces of said leaves. Conveniently, said leaves are formed of low friction material to facilitate removal of articles from said storage zones.

To facilitate loading of articles onto the storage zones, each of said spacing elements is preferably movable on the guide means between a normal position in which it can co-operate with an adjacent one of said spacing elements to define a respective one of the storage zones and a loading position away from said normal position.

Preferably, said guide means define a track along which said spacing elements can move, said track including an upright portion and a further portion offset from said upright portion, said spacing elements assuming said loading position upon movement along said further portion.

Preferably said co-acting means defines an engaging means for releasably engaging said guide means.

In one arrangement, said engaging means comprises a support part and an engaging part, said engaging part being movable between engaging and release conditions and including two spaced arm portions and an elongated bridging portion extending between and formed integrally with said arm portions, said arm portions each being mounted on the support for pivotal movement about a respective pivot axis between a first position corresponding to said engaging conditions and a second position corresponding to said release condition, said bridging portion being adapted for movement between two stable positions one corresponding to said engaging condition and the other corresponding to said release condition, there being an unstable zone between said two stable positions thereby said bridging portion is urged to one or the other of said stable positions.

Preferably the spacing between said pivot axes is fixed.

BEST MODES OF CARRYING OUT THE INVENTION

Figure 8:
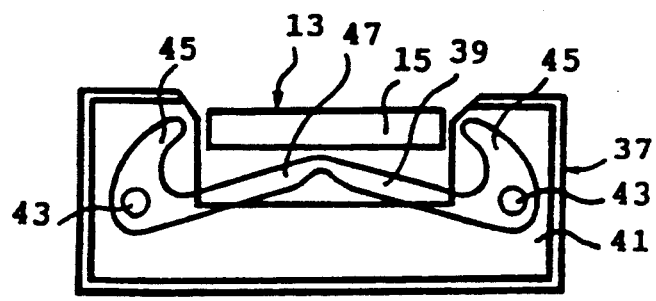
FIG. 8 is a schematic view showing engaging means provided on each leaf.
Figure 9:
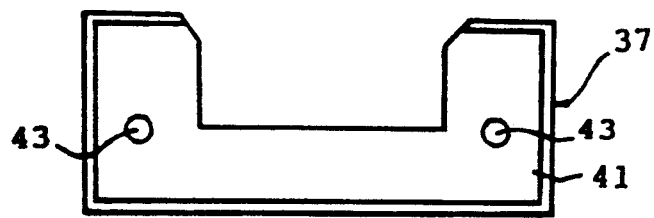
FIG. 9 is a schematic plan view of a support part of the engaging means.
Figure 10:
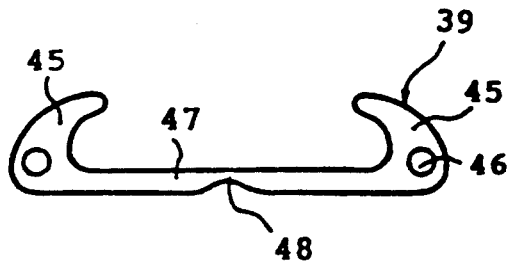
FIG. 10 is a schematic plan view of an engaging part of the engaging means.

The embodiment shown in FIGS. 1 to 14 of the drawings is directed to a device 10 for supporting folded bath towels 11 in a pile so that any one of the bath towels can be easily and conveniently removed from the pile. The device 10 comprises a base 12 of rectangular configuration and a guide means 13 mounted on the base adjacent an edge thereof. The base 12 is supported on friction pads 14 located at the front end thereof. There are no friction pads at the back end of the base so as to facilitate easy sliding or positioning of the base on a shelf or other support surface. The guide means 13 may be detachable from the base 12 if desired to facilitate storage when not in use. The guide means 13 is in the form of an upright support defining a track having an inner track section 15, an outer track section 16 offset from the inner track section, and an intermediate track section 17 between the inner and outer sections. The inner and outer track sections 15 and 16 respectively are generally upright and the intermediate section 17 is arcuate. The track sections 15, 16 and 17 are formed integrally and are rectangular in cross section, as shown in FIG. 8. A brace 18 extends between the inner and outer track sections 16 and 17 for stability and structural strength. A stop 19 is provided on the outer track section 16, the purpose of which will be explained later.

The device further comprises a plurality of spacing elements 20 which co-act with the guide means 13 for movement along the track. The spacing elements each comprise a rectangular leaf having an inner edge 21, an outer edge 22 and a pair of side edges 23. Each leaf is formed from a thin sheet of substantially rigid plastics material having low friction properties. In this embodiment the plastics material forming each leaf is preferably clear so as to be inconspicuous. A central strengthening rib 25 extends between the inner and outer edges 21 and 22.

The guide means 13 co-acts with the leaves to maintain the leaves in position while allowing them to move along the track. More particularly, the leaves 20 are in slidable engagement with the track defined by the guide means. With this arrangement, the leaves 20 occupy a normal position in which they are located one above another when in engagement with the inner track section 15. When there are no towels in the device, the leaves 20 can rest one upon another, with the lowermost leaf resting on the base 12.

Storage zones 29 for accommodating the towels 11 are defined between adjacent leaves 20 when the leaves are in a spaced relationship and in engagement with the inner track section 15. With this arrangement, each towel 11 (apart from the lowermost towel) rests on one of the leaves and supports the leaf immediately above it. In this way, the towels 11 maintain the spaced relationship between the leaves 20 while the towels are in the storage zones 29. The lowermost towel is simply supported on the base with the lowermost leaf resting on the towel.

The towels 11 are separated by the leaves 20 with the result that the pile is not disrupted when any one of the towels is removed. The low friction characteristics of the leaves allow each towel to be easily withdrawn from its storage zone. The leaves 20 are, however, so dimensioned as to be a little smaller than the folded towels 11 so that when in the storage zones the towels extend beyond the outer edge 22 and side edges 23 of the leaves. With this arrangement there is some frictional contact between adjacent towels in the pile which gives lateral stability to the pile. Because the towels 11 project a little beyond the outer edges of the leaves they can be easily grasped and withdrawn from the storage zone through the outer end thereof when required for use.

Figure 1:
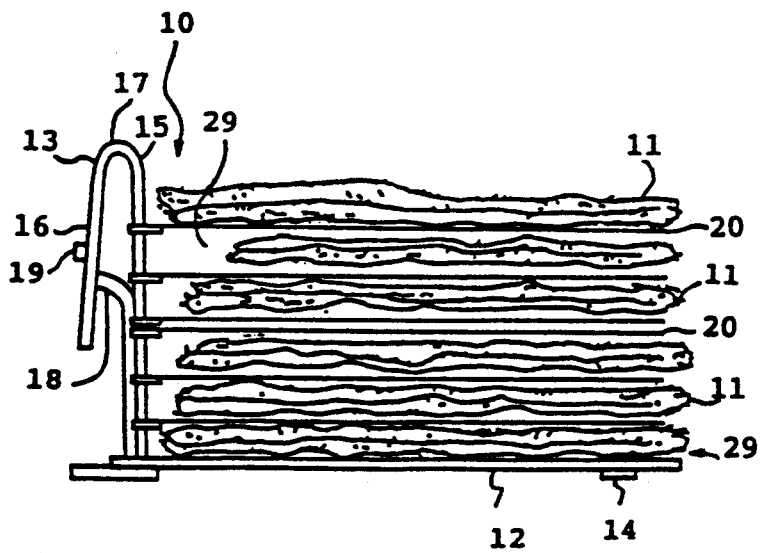
FIG. 1 is a schematic side view of a device according to the embodiment supporting a pile of towels.
Figure 2:
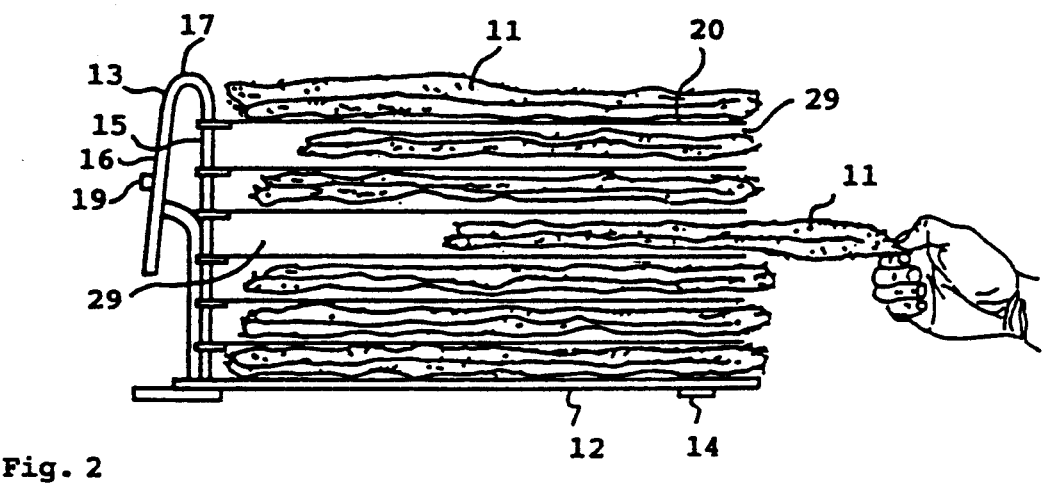
FIG. 2 is a view similar to FIG. 1 but showing one of the towels being removed from the pile.
Figure 3:
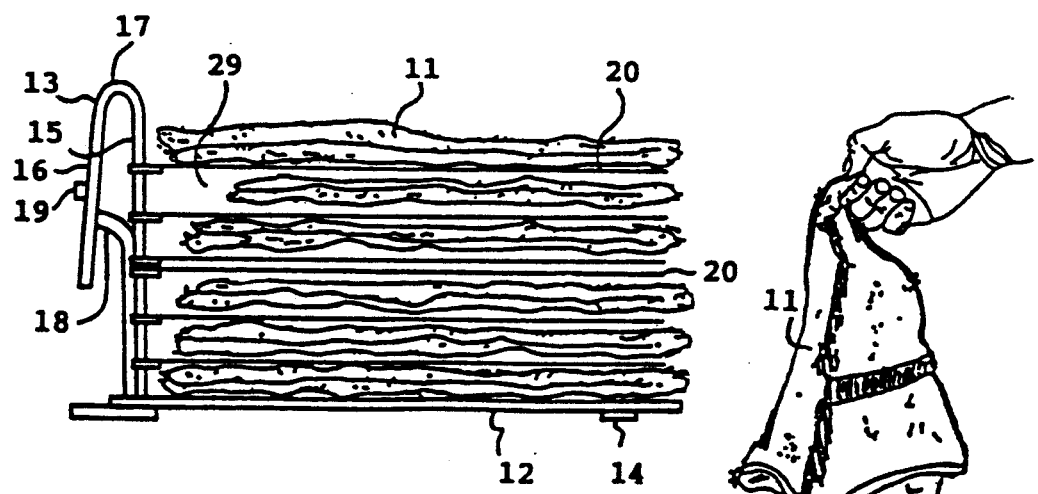
FIG. 3 is also a view similar to FIG. 1 but showing one of the towels removed from the pile.

When a towel is withdrawn from the device, the leaf 20 which was previously resting on the towel moves downwardly to occupy a position in which it rests on the leaf immediately below it. At the same time, other leaves higher in the pile also move downwardly together with any towels stored between those leaves, as shown in FIGS. 2 and 3. In this way, the height of the pile progressively decreases as towels are removed from it but the orderly arrangement of the pile is not disrupted.

Figure 4:
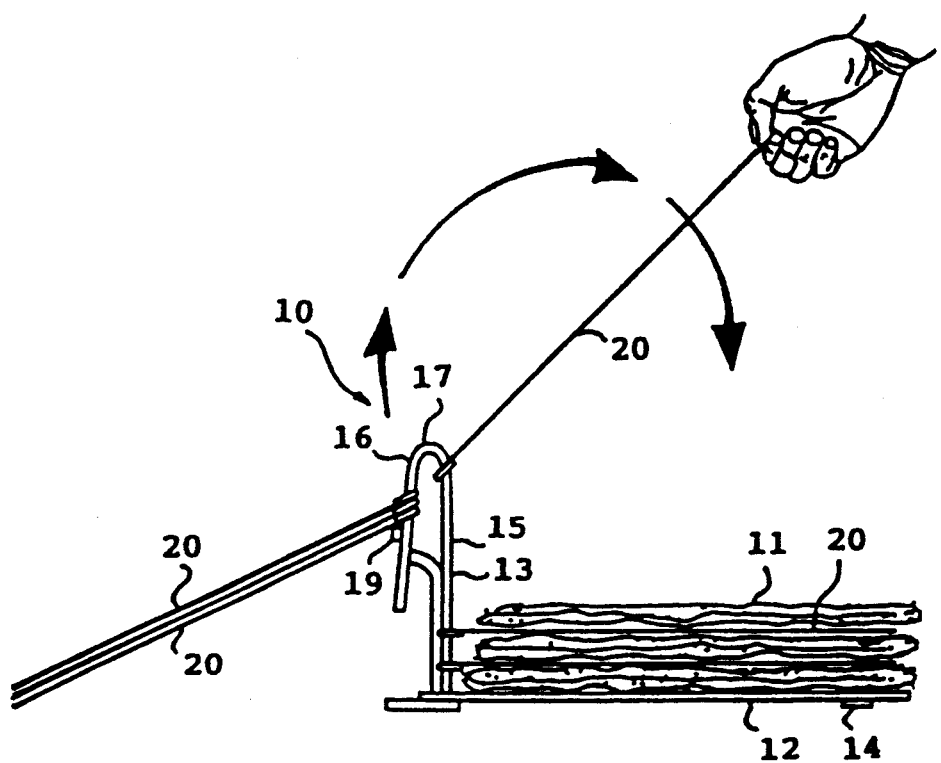
FIG. 4 is a schematic side view showing the towels being loaded into the device according to the embodiment.
Figure 5:
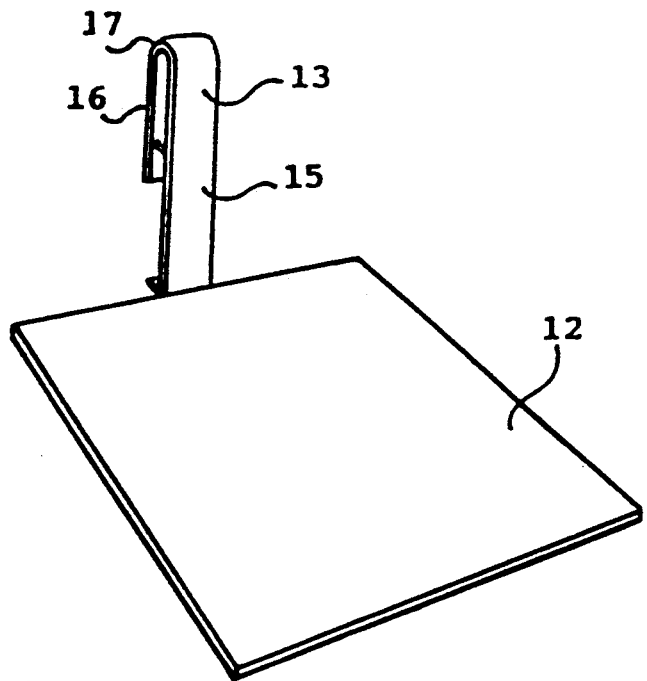
FIG. 5 is a perspective view of part of the device according to the embodiment.
Figure 6:
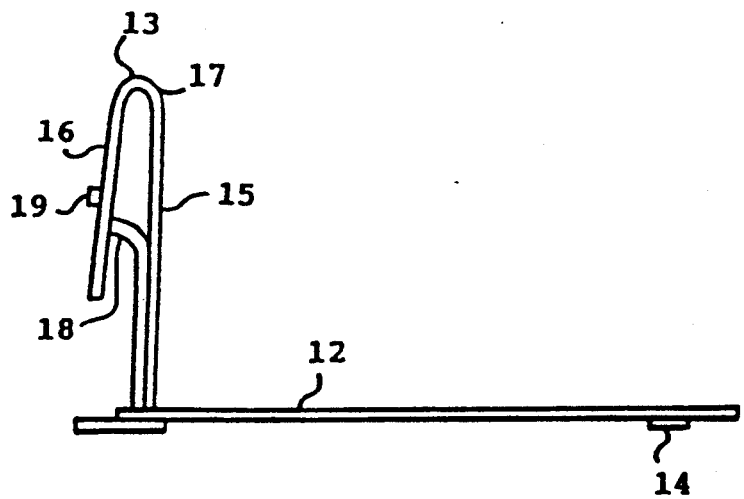
FIG. 6 is a side view of the part shown in FIG. 5.
Figure 7:
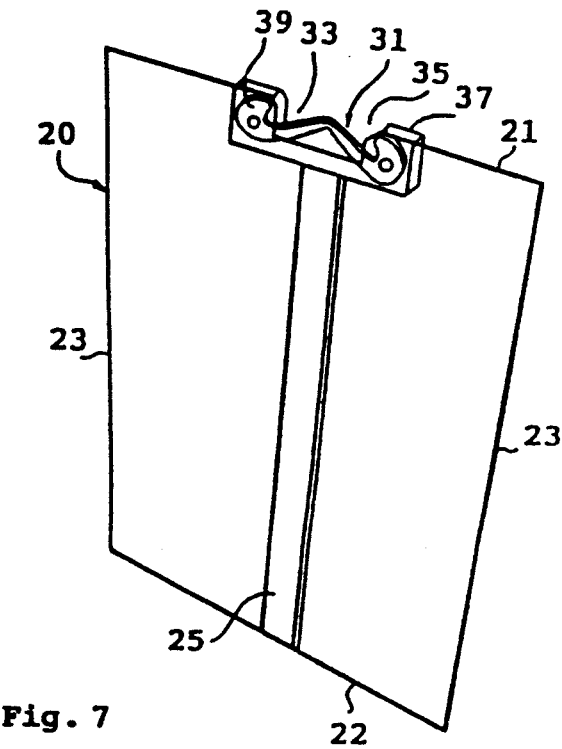
FIG. 7 is a perspective view of a leaf which forms a further part of the device according to the embodiment.

To load towels into the storage device, the leaves 20 can be moved out of the normal position into a loading position by turning them rearwardly; that is by moving them along the track through the intermediate track section 17 onto the outer track section 16 in which position they are clear of the base 12. The stop 19 serves to limit downward movement of the leaves 20 in the outer track section. With the leaves 20 in the loading position, towels can then be progressively loaded into the storage device and the leaves sequentially returned to the normal position on the inner track section 15 as each towel is placed in the device, as shown in FIG. 4 of the drawings.

While the leaves can remain permanently attached to the guide means 13 (as will be described in more detail later) in this embodiment the leaves are detachable from the guide means so that they can be selectively removed as the size of the pile progressively decreases. This allows leaves which remain in the pile but which are superfluous at the time, to be removed and reattached to the inner track section 15 to provide additional storage zones at the top of the pile. This approach allows towels to be added to the pile as they become available rather than waiting for a collection of towels and then loading all of the towels into the device in the manner described earlier where the leaves are moved into the loading position.

To provide for selective detachment from the guide means 13, each leaf 20 is provided with engaging means 31 for releasably engaging the guide means, the engagement being in a manner which allows the leaf to move along the track as previously described. The engaging means 31 is associated with a recess 33 provided in each leaf 20 at the inner edge 21 thereof, being the edge which is adjacent to the guide means. The recess 33 opens onto the inner edge of the leaf at opening 35 so that the track has access to the recess through the opening. The recess 33 is of such size and shape that the track defined by the guide means can be received in the recess.

Referring in particular to FIGS. 8 to 14 the engaging means 31 comprises a support part 37 and an engaging part 39. The support part 37 comprises a housing 41 which is disposed on the underside of the leaf 20 adjacent to the recess 33 and which is attached to the inner end of the central rib 25. The housing is relatively thin in edge profile and of streamlined form to allow for easy withdrawal of superfluous leaves in the device.

The housing 41 accommodates the engaging part 39 and has a pair of inner side faces 42 between which the engaging part is received. The support part 37 includes a pair of fixed pivot pins 43 positioned on opposed sides of the recess 33.

Figure 11:
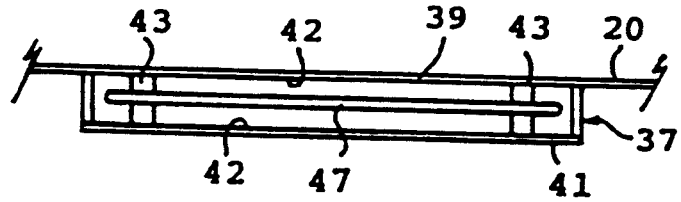
FIG. 11 is a schematic side view of the engaging means.
Figure 14:
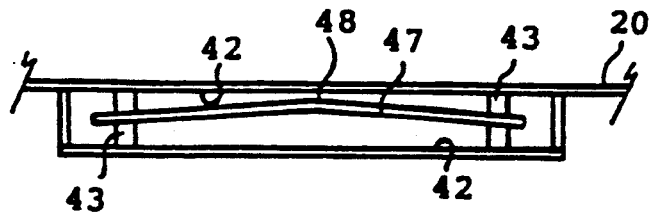
FIG. 14 is a view similar to FIG. 11 with the exception that a bridging portion which forms part of the engaging part is shown in a laterally deflected condition which is assumed as the engaging part moves between the engaging and release positions.

The engaging part 39 is formed of rigid plastics material such as polypropylene and is relatively thin in edge profile, as shown in FIGS. 11 and 14. It comprises two arm portions 45 and an elongated bridge portion 47 extending between and formed integrally with the arm portions. The arm portions 45 are each mounted on one of the pivot pins 43 for pivotal movement between an engaging position and a release position, holes 46 being provided in the arm portions to receive the pivot pins 43. The bridge portion 47 is movable between two stable positions, being a first position corresponding to the engaging position of the arm portions and a second position corresponding to the release position of the arm portions. There is an unstable zone between the two stable positions which results in the bridging portion being urged to one or the other of the stable positions. The bridge portion is formed so that it can deflect laterally in two mutually perpendicular directions to accommodate such movement, one direction being generally parallel to the pivot axes defined by pivot pins 43 and the other being generally perpendicular thereto in the direction of movement of the bridge portion between the two stable positions. The bridge portion is of reduced section at 48 to provide a region about which it can flex to accommodate the lateral movement as it moves between the two stable positions. The spacing between the pivot pins 43 is fixed. The bridge portion 47 undergoes axial compression as it moves through the unstable zone from either one of the two stable zones due to the fact that the distance between the two holes 46 in the engaging part 39 is slightly larger than the distance between the two fixed pivot pins 43 on the support part. The contact force needed to move the bridge portion 47 through the unstable zone from either of the two stable zones can be increased or decreased by lengthening or shortening the distance between the two holes in the engaging part.

Figure 12:
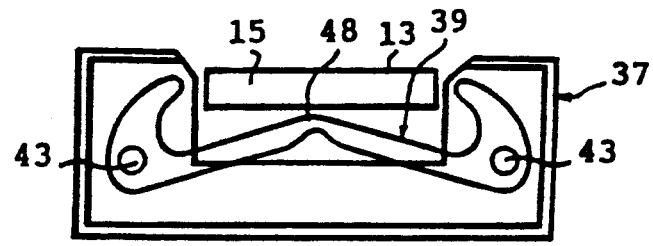
FIG. 12 is a plan view of the engaging means in a release position.
Figure 13:
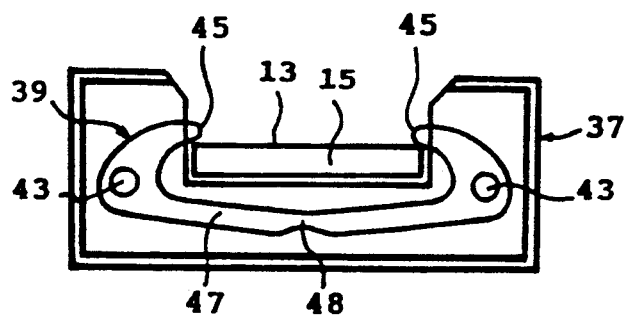
FIG. 13 is a view similar to FIG. 12 except that the engaging means is shown in an engaging position.

The deflection of the bridging portion can be better understood by reference to FIGS. 41 and 14 of the drawings. In FIG. 11, the bridge portion is shown in a normal (undeflected) condition as is the case when it is at either one of the two stable positions. In FIG. 14, the bridge portion is shown in a condition where it has deflected laterally in a direction parallel to the pivot axes (and thus towards one of the side faces 42 of the housing 41). This deflection introduces stresses into the bridge portion which urge it to one or the other of the stable positions. This tendency exhibits itself in the form of a snapping action whereby the bridge portion snaps from one stable position to the other stable position after passing through the unstable zone. This snapping action generates a snapping sound which is particularly useful because it provides an audible indication to the operator that the engaging means has releasably engaged the guide means. At the same time, the bridging portion also deflects laterally in said other direction to accommodate movement of the bridge portion through an over-centre position between the two stable positions, one of which is shown in FIG. 12 and the other of which is shown in FIG. 13. The bridging portion flexes to accommodate the lateral deflection in the two mutually perpendicular directions, the flexing occurring at the reduced section 48.

When the engaging means 31 is in the engaging position, the arm portions 45 extend into the recess 33 but the bridge portion is located within the confines of the housing, as shown in FIG. 13 of the drawings. When in the release position, the arm portions 45 are within the confines of the housing 41 and the central region of the bridge portion 47 extends into the recess, as shown in FIG. 12. With this arrangement, the central region of the bridging portion is exposed for contact with the track defined by the guide means 13 as the latter enters the recess, the bridge portion being in the second position at this stage. A contact force between the track and the bridging portion of predetermined magnitude causes the bridge portion to move laterally through the unstable zone from the second stable position into the first stable position with the result that the arm portions are moved from the release position to the engaging position, so securing the leaf to the guide means. The bridge portion can be returned to the second stable position by moving the arm portions from the engaging position to the release position, but the application of a force of predetermined magnitude is required to effect this movement. This feature is used in releasably connecting the leaves to the guides, as will now be explained. When a leaf is in engagement with the track of the guide means, the action of pulling a towel from the storage zone 29 in which it is accommodated does not exert a sufficient force on the leaf (by way of friction) to cause the resulting reaction forces between the guide means and the arm portions to overcome the biasing effect of the bridge portion to move the arm portions from the engaging position to the release position. Removal of the leaf can, however, be achieved by manually pulling the outer edge thereof at the strengthening rib 25 with a force exceeding the predetermined force required to be exerted on the arm portions by the guide means to cause pivotal movement of the arm portions against the influence of the bridge portion 47 from the engaging position to the release position. In other words, the leaf 20 can be removed from the guide means 13 simply by pulling the leaf with sufficient force. It is a simple matter to return the leaf 20 into engagement with the guide means, it only being necessary to present the leaf to the guide means such that the guide means is received within the recess and sufficient force applied to cause the guide means to push the bridging portion from the second stable position into the first stable state.

Figure 15:
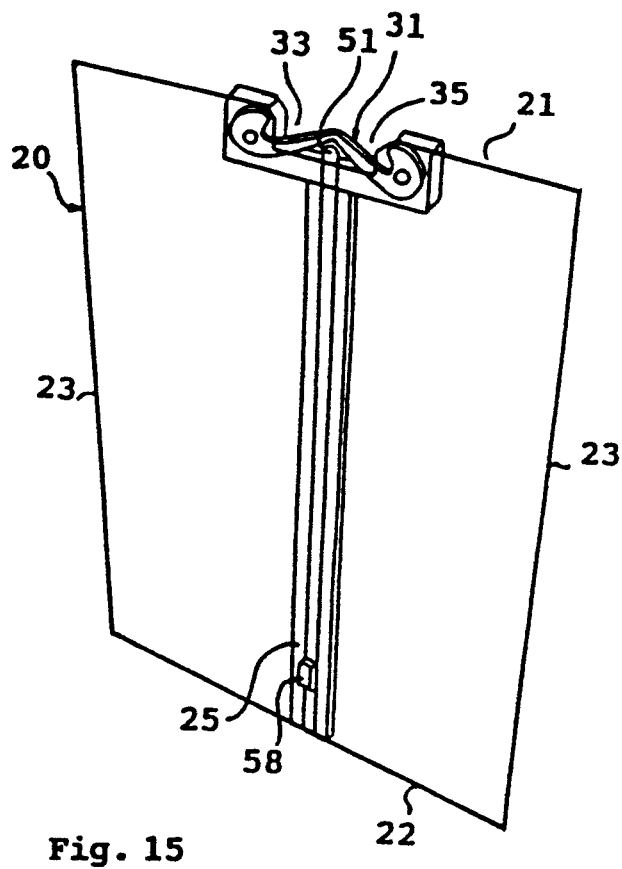
FIG. 15 is a perspective view of a leaf for a device according to a second embodiment.
Figure 16:
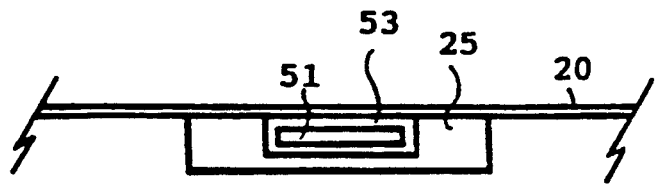
FIG. 16 is a cross-sectional view of part of the leaf of FIG. 15.

There may be circumstances where it is desirable to prevent reaction forces between the guide means 13 and the engaging part 39 from moving the arm portions 45 between the engaging and release positions. Such a situation may arise where heavy articles (such as blankets) are stored between the leaves 20 with the result that high forces are applied to the leaves through friction as the articles are withdrawn from the storage zones. In such a situation, the predetermined , force required to release the leaves from engagement with the guide means has to be increased substantially in comparison to when the device is used for towels. The increased contact force still allows the operator to attach the leaf to the guide means with ease, however, the force required to detach the leaf makes it too difficult to operate simply by pulling on the leaf. To accommodate such situations, means may be provided for manually operating the engaging means to move the arm portions from the engaging position to the release position. Such an arrangement is illustrated in FIGS. 15 and 16 of the accompanying drawings where an elongated control member 51 is accommodated within a longitudinal passage 53 in the strengthening rib 25 of the leaf. The control member 51 extends along the passage 53 such that one end of the control member can push on the bridging portion to move it from the first stable state corresponding to the engaging position of the arms to the second stable state corresponding to the release position of the arms. The other end of the control member 51 is connected to an actuator such as a button 58 exposed adjacent the outer end of the leaf whereby a user can conveniently operate the control member by movement of the button.

Figure 17:
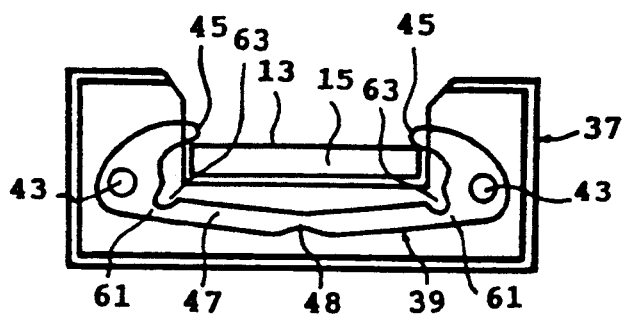
FIG. 17 is a view of engaging means of a device according to a third embodiment, the engaging means being shown in an engaging position.
Figure 18:
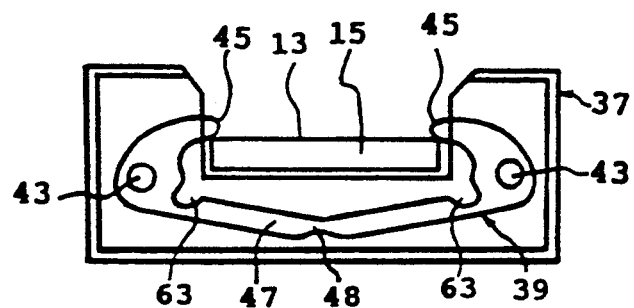
FIG. 18 is a view similar to FIG. 17 with the exception that the engaging means is shown in a condition in which it resists movement from the engaging position to the released position.
Figure 19:
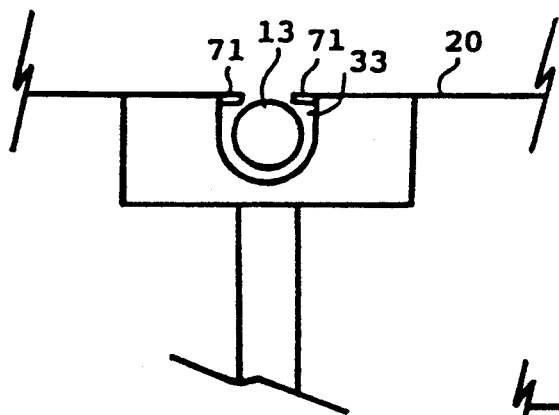
FIG. 19 is a fragmentary view of a device according to a further embodiment showing engaging means co-operating with the guide means.

There may be situations where it is desirable to ensure that the engaging means 39 cannot be operated to release from the guide means 13 simply by applying forces to the arm portions 45. To accommodate such situations, at least one of the arm portions 45 can be constructed so that it deflects without causing the bridge portion 47 to move out of the first stable state corresponding to the engaging position of the arm portions. Such an embodiment is shown in FIGS. 17 and 18 wherein the engaging part is provided with weakened sections 61 which cause deflection of the arm portions without operation of the bridge portion. The engaging part is weakened by providing a notch 63 on its inner edge between its pivot axis and the bridging portion. The arm portions are shown in an undeflected state in FIG. 17. When there is an attempt to detach the leaf from the guide means simply by pulling on the leaf, reaction forces between the guide means and the arm portions cause the arm portions to deflect about the weakened sections (as shown in FIG. 18). The arm portions 45 can be returned to the engaging position upon the bridge portion 47 being contacted by the guide means with a force of predetermined magnitude, as was the case with the first embodiment. In other words, the weakening of the engaging part with notches 63 does not alter in any way functioning of engaging part in assuming the engaging position. The control means is required for the engaging part to assume the release position, as the engaging part cannot move from the engaging to the release position as a result of application of force to the arm portions. The leaves 20 can be releasably engaged with the guide means 13 in various ways other than by way of the engaging means 31 described in the first embodiment. One such other engaging means is shown in FIG. 19 of the drawings and comprises a pair of resilient arms 71 which extend inwardly across the opening of the recess 33, with the spacing between the arms being less than the corresponding width of the guide means 13 (which in this embodiment is circular in cross section). With this arrangement the arms 71 prevent the guide means 13 from being withdrawn from the recess 33 until a force of sufficient magnitude is applied to cause the arms 71 to deflect so allowing the guide means to pass therebetween.

A further feature of this embodiment is that with the guide means 13 of circular cross section, the leaves 20 can be pivoted sideways around the guide means to facilitate loading of articles into the device, rather than turning the leaves rearwardly as was the case in the first embodiment.

Figure 20:
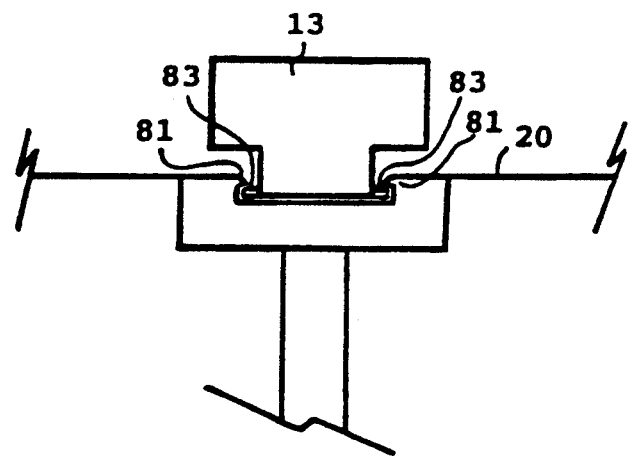
FIG. 20 is a fragmentary view of a device according to a still further embodiment showing engaging means co-operating with guide means.

A further arrangement for releasably engaging the leaves with the guide means is illustrated in FIG. 20 where each leaf 20 is provided with a pair of rigid arms 81 which extend inwardly across the opening of the recess 33 for engagement against a pair of resilient tabs 83 provided on the guide means 13. With this arrangement, the leaf 20 is released from the guide means 13 by applying a force to the leaf of sufficient magnitude to cause the tabs 83 on the guide means 13 to deflect to allow the leaf to be released.

Figure 21:
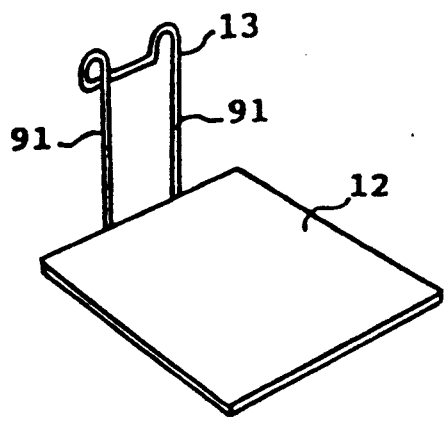
FIG. 21 is a perspective view of a base and guide means of a device according to a still further embodiment.

There may be situations where it is not necessary to have leaves which can be removed from the guide means and so permanent engagement with the guide means is acceptable. This form of engagement can be achieved in various ways, one of which is illustrated in FIGS. 20 and 21 of the drawings where the guide means 13 comprises a pair of pillars 91 and each leaf 20 is formed with a pair of apertures 93 for receiving the pillars. The upper ends of the pillars 91 are configured so that the leaves can be turned rearwardly into a loading position (in much the same way as in the first embodiment) for loading articles into the device.

Figure 22:
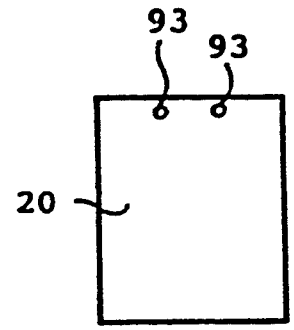
FIG. 22 is a plan view of a leaf for use with the guide means of the device shown in FIG. 21.
Figure 23:
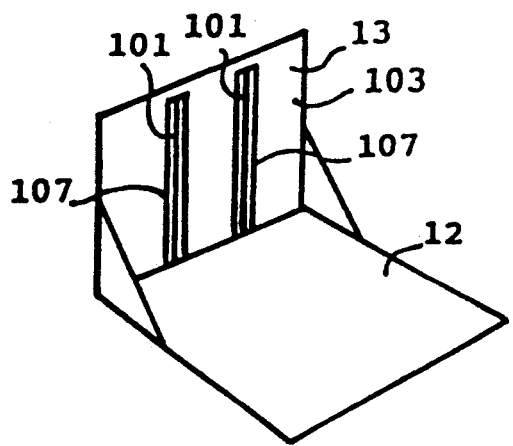
FIG. 23 is a schematic perspective view of a base and guide means of a device according to a still further embodiment.
Figure 24:
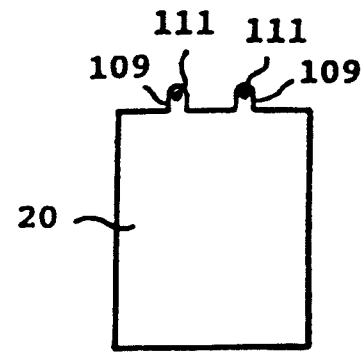
FIG. 24 is a plan view of a leaf for use with the guide means of the embodiment shown in FIG. 23.

A somewhat similar embodiment is illustrated in FIGS. 22 and 23 of the drawings. In this arrangement, the guide means 13 is mounted on the base 12 so that it can be collapsed for storage purposes. The guide means 13 comprises a pair of pillars 101 supported on a panel 103 hingedly mounted on the base for movement between an upright position (as shown in the drawings) and a collapsed condition in which it rests against the base. The pillars are located behind the supporting panel and elongated apertures 107 are provided in the panel to provide access to the pillars. Each leaf 20 has a pair of tabs 109 on its inner edge, one tab corresponding to each pillar. In each tab there is a hole 111 through which the pillar is received when the leaf is in engagement with the pillar.

With the embodiments described above, the device would usually be located on a shelf and loaded in that position or removed and supported on a flat surface such as a table while loading takes place. It is, however, possible for the device to be mounted on the inside of a closet door and loaded in that position. This can be achieved by permanently fixing a receptacle to the inside of the door which allows the bottom of the outer track section of the guide means to be lodged in it. In this case when the spacing elements are turned rearwardly into the loading position, they are held in an upright position in the gap between the surface of the door and the outer track of the guide means.

In all of the embodiments described above, the guide means has been supported on a base. There are, however, situations where a base is not necessary, such as when articles are to be stored on a shelf adjacent a wall. In this situation, the guide means can be mounted directly onto the wall so as to allow the shelf to function as the base for supporting the lowermost article.

Finally, it should be appreciated that the scope of the invention is not limited to the scope of the various embodiments described.

The claims defining the invention are as follows:

1. A device for supporting articles in a pile, said device comprising: a guide means; a plurality of spacing elements each having two opposed surfaces, each surface having a low sliding coefficient of friction; means provided on the spacing elements for co-acting with said guide means to allow movement relative thereto for varying the spacing between said two opposed surfaces of said adjacent spacing element members; said co-acting means being substantially unrestrained by said guide means in the direction of said movement; said spacing elements adjacent to one another when in a spaced apart relationship defining a storage zone for receiving and storing an article; said spacing elements in use at least partially separating neighboring articles in the pile to permit any one of the articles to be removed without disrupting the pile, said low sliding coefficient of friction of said opposed surfaces facilitating removal of the article from the respective storage zone.

2. A device according to claim 1 wherein said spacing elements comprise leaves, the major faces of each defining said opposed surfaces said storage zones being defined between the major faces of said leaves.

3. A device according to claim 1 wherein said guide means is mounted on a base.

4. A device according to claim 1 wherein said guide means is adapted to permit movement of each one of said spacing elements between a normal position in which it can co-operate with an adjacent one of said spacing elements to define a respective one of the storage zones and a loading position away from said normal position to facilitate loading of articles into said storage zone.

5. A device according to claim 4 wherein said guide means define a track along which said spacing elements can move, said track including a generally upright portion and a further portion offset from said upright portion, said spacing elements assuming said loading position upon movement along said further portion.

6. A device according to claim 5 wherein said offset portion includes an arcuate portion.

7. A device according to claim 1 wherein said co-acting means defines an engaging means for releasably engaging said guide means.

8. A device according to claim 7 wherein said engaging means comprises a support part and an engaging part, said engaging part being movable between engaging and release conditions and including two spaced arm portions and an elongated bridge portion extending between and formed integrally with said arm portions, said arm portions each being mounted on said support part for pivotal movement about a respective pivot axis between a first position corresponding to said engaging condition and a second position corresponding to said release condition, said bridge portion being adapted for movement between two stable positions one corresponding to said engaging condition and the other corresponding to the said release condition, there being an unstable zone between said two stable positions thereby said bridge portion is urged to one or the other of said stable positions.

9. A device according to claim 8 wherein said bridge portion is adapted for lateral deflection in two mutually perpendicular directions to accommodate movement between said two stable positions.

10. A device according to claim 9 wherein said mutually perpendicular directions comprise a first direction generally parallel with said pivot axes and a second direction being in the direction of movement of said bridge portion as it moves between the two stable positions.

11. A device according to claim 9 wherein said edge portion is provided with a reduced section to accommodate said lateral deflection 12. A device according to claim 9 wherein said bridge portion passes through the centre line extending between said pivot axes as it moves between said stable positions.

13. A device according to any one of claims 8 to 12 wherein the spacing between said pivot axes is fixed.

14. A device according to claim 13 wherein each of said pivot axes is defined by a pivot pin provided on the support part.

15. A device according to claim 14 wherein a hole is provided in each arm portion for receiving a respective one of said pivot pins, the spacing between said holes being slightly larger than the spacing between said pivot pins so that axial compression is induced in said bridging portion.

16. A device according to claim 8 wherein said engaging part is relatively thin in edge profile.

17. A device according to claim 8 wherein said engaging part is accommodated in a housing, said housing defining a recess to receive said guide means, said bridge portion being movable with respect to the recess between said two stable positions as said arm portions move between said first and second positions wherein when in said other stable position said bridging portion is exposed for contact with said guide means as the latter enters said recess, said bridging portion being adapted to move from said other stable position into said one stable position upon the application thereto of a predetermined contact force by the guide means, said force arising as the respective spacing element is pushed towards said guide means with sufficient force.

18. A device according to claim 17 wherein said arm portions are associated with said recess to confine said guide means within said recess when said arm portions are in said first position.

19. A device according to claim 18 wherein said bridge portion is adapted to move from one flawable position into said other stable position upon the application of a force of predetermined magnitude to said arm portions, said force arising as a result of reaction between said arm portions and said guide means as the respective spacing element is pulled away from the guide means with sufficient force.

20. A device according to claim 17 wherein there is provided a control means operable to move said bridging portion from said one stable position to said other stable position.

21. A device according to claim 20 wherein said control means comprises a control rod slidably mounted on each spacing element for operative engagement with said bridging portion.

22. A device according to claim 17 wherein said engaging part is adapted to resist movement from said first position into said second position in response to the application of force to said arm portions.

23. A device according to claim 22 wherein said engaging part is adapted to resist movement from said first position to said second position by provision of a weakened section in said engaging part.

24. A device according to claim 23 wherein said weakened section comprises a notch on the inner edge of at least one arm portion between the pivot axis thereof and said bridge portion.

25. A device according to claim 1 wherein said co-acting means comprises at least one hole in each leaf for receiving said guide means.

* * * * *

UNITED STATES PATENT AND TRADEMARK OFFICE
CERTIFICATE OF CORRECTION

PATENT NO. : 5,284,258
DATED : Feb. 8, 1994
INVENTOR(S) : Claude P. Genero; Gail A. Genero It is certified that error appears in the above-indentified patent and that said Letters Patent is hereby corrected as shown below:

Column 4, line 14, delete "-" first occurrence.

Column 5, line 44, change "41" to read --11--.

Column 6, line 56, delete "," second occurrence.

Column 9, line 8, delete ",".

Column 9, line 8, change "each defining" to read --which define--.

Column 9, line 9, after "surfaces" insert --,--.

Column 9, line 61, change "edge" to read --bridge--.

Column 10, line 35, change "flawable" to read --stable--.

Signed and Sealed this

Sixth Day of September, 1994

Attest:

BRUCE LEHMAN

Attesting Officer    Commissioner of Patents and Trademarks